US007817782B1

(12) United States Patent
Banner et al.

(10) Patent No.: US 7,817,782 B1
(45) Date of Patent: Oct. 19, 2010

(54) SYSTEM AND METHOD TO SUPPORT A TELECOMMUNICATION DEVICE FOR THE DEAF (TDD) IN A VOICE OVER INTERNET PROTOCOL (VOIP) NETWORK

(75) Inventors: Barbara Banner, Hazlet, NJ (US);
Silvano Brewster, Aberdeen, NJ (US);
Hilary Higgs, Matawan, NJ (US);
Dominic Ricciardi, Bridgewater, NJ (US); Amita Vijay, Lakewood, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1224 days.

(21) Appl. No.: 11/372,787

(22) Filed: Mar. 10, 2006

(51) Int. Cl.
*H04M 11/00* (2006.01)
(52) U.S. Cl. .................................................. 379/52
(58) Field of Classification Search ............ 379/52, 379/90.01; 370/352
See application file for complete search history.

(56) References Cited

U.S. PATENT DOCUMENTS

| | | | |
|---|---|---|---|
| 6,668,043 B2 | 12/2003 | Hyziak et al. | |
| 6,914,964 B1 | 7/2005 | Levine | |
| 7,610,547 B2 * | 10/2009 | Wang et al. | 379/88.01 |
| 2002/0057765 A1 * | 5/2002 | Hyziak et al. | 379/52 |
| 2005/0054380 A1 | 3/2005 | Michaelis | |
| 2005/0094775 A1 | 5/2005 | Smith, Jr. et al. | |
| 2005/0094776 A1 | 5/2005 | Haldeman et al. | |
| 2005/0094777 A1 | 5/2005 | McClelland | |
| 2005/0129185 A1 | 6/2005 | McClelland et al. | |

OTHER PUBLICATIONS

VoiceGenie Developer Workshop—VoiceXML 2.0/2.1 Reference; http://developer.voicegenie.com/voicexml2tagref.php?tag=st_grammar&display=standardtags, printed Mar. 10, 2006, 6 pages.

* cited by examiner

*Primary Examiner*—Stella L Woo

(57) ABSTRACT

Disclosed is a system and method for communicating with a Telecommunication Device for the Deaf (TDD). A TDD message is transmitted to a TDD device over the VoIP network. The TDD message may be in the form of Baudot tones. The system interprets a voice markup language document to accept TDD input as a form of user input. The system receives TDD input from the TDD device based on the TDD message.

19 Claims, 2 Drawing Sheets

SYSTEM AND METHOD TO SUPPORT A TELECOMMUNICATION DEVICE FOR THE DEAF (TDD) IN A VOICE OVER INTERNET PROTOCOL (VOIP) NETWORK

BACKGROUND OF THE INVENTION

The present invention relates generally to Voice over Internet Protocol (VoIP) networks, and more particularly to supporting a Telecommunication Device for the Deaf (TDD) in a VoIP network.

A telecommunication device for the deaf (TDD) (sometimes referred to as a Text Telephone (TTY or TT) or Telephone Text Device (TTD)) enables people who are hearing or speech impaired to communicate over the public switched telephone network (PSTN) using text messages. Typically, a user of the TDD device enters a desired text message into the TDD device, and the text message is transmitted over a network to another TDD device.

A user of a TDD device can also access network-based services, such as toll free services, supported by the PSTN. Toll free services typically offered to TDD device users over a telephone network often include a menu-based system offering a variety of options to choose from.

Many telephony networks are being migrated to Voice over Internet Protocol (VoIP) networks. This migration often causes the services previously available to TDD device users via traditional telephone services to no longer be available because these services are not traditionally provided by VoIP networks.

Therefore, there remains a need to provide network-based services to TDD devices when communicating over a VoIP network.

BRIEF SUMMARY OF THE INVENTION

In accordance with the principles of the present invention, a system interprets a voice markup language document supporting a TDD device. The supporting of a TDD device includes expanding the grammar associated with the voice markup language document to accept TDD as a form of user input. The system then transmits a TDD message (also referred to below as a TDD announcement) to the TDD device over a VoIP network. The TDD announcement may be in the form of Baudot tones. The system receives TDD input from the TDD device based on the TDD announcement. As stated above, this receiving of TDD input is a result of the interpretation of the voice markup language document supporting the TDD device.

More specifically, the system sets up a call with a user endpoint and then identifies the user endpoint as a TDD device. A message is then transmitted from an application server to a media server in response to the identifying of the TDD device. The message instructs the media server to play the announcement to the TDD device. The announcement is played based on interpreting the voice markup language document, such as a Voice Extensible Markup Language (VXML) document. The system then receives the TDD input from the TDD device. The TDD input is then processed to determine what happens next with the call.

In one embodiment, the media server includes an interpreter for interpreting the VXML document that supports TDD devices. The grammar specified in the VXML document is expanded to accept TDD input as a form of user input. This expansion enables the communication with a TDD device as described above. In one embodiment, the media server selects a TDD announcement to play from a plurality of TDD announcements based on the VXML document.

These and other advantages of the invention will be apparent to those of ordinary skill in the art by reference to the following detailed description and the accompanying drawings.

DETAILED DESCRIPTION

Figure 1:
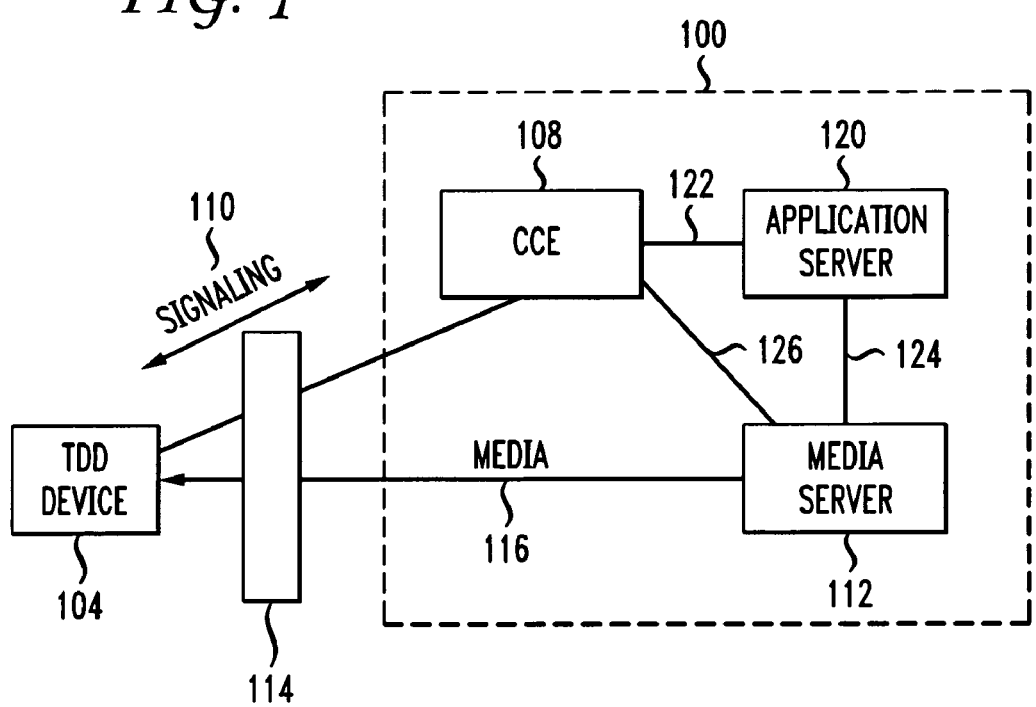
FIG. 1 shows a block diagram of a Voice over Internet Protocol (VoIP) network communicating with a TDD device in accordance with an embodiment of the invention.

FIG. 1 is a block diagram of a VoIP network 100 establishing communications with a TDD device 104. The TDD device 104 is a communication device that allows hearing-impaired users to communicate using text messages. When the term "TDD device" is used, it also refers to Telephone Text Devices (TTD) and Text Telephones (TTY or TT).

The conventional Public Switched Telephone Network (PSTN) is a circuit switched network in which calls are assigned dedicated circuits during the duration of the call. Such networks are well known in the art, and service providers have developed various services which may be provided to subscribers via such a conventional circuit switched network.

Recently, data packet networks, such as local area networks (LAN) and wide area networks (WAN) have become more prevalent. These data packet networks operate in accordance with the internet protocol (IP) and such networks are referred to as IP networks. The popularity of IP networks has created an interest in providing voice and related services over IP networks.

Conventional PSTN voice services dedicate a circuit connection between a calling and called party, and as such, that connection is guaranteed a certain level of performance because it is not shared with any other network users. IP networks, on the other hand, are shared networks in which the network resources are shared between users. The notion of a connection in a data packet network is very different from the notion of a connection in a circuit network. In a circuit network, the connection is a dedicated circuit which is used only by the calling and called parties. As such, it is easy to guarantee a certain level of service via the circuit network. The problem with such a network is that of efficiency. That is, the dedication of a circuit between all calling and called parties may be inefficient because such dedicated circuits provide more bandwidth than is necessary. In a data network, the connection between two parties is not dedicated, and traffic between the parties is transmitted via the data packet network along with the data packets of other users. There is no dedicated path between the parties, and data packets may be transmitted between the parties via different paths, depending upon network traffic.

Unlike traditional PSTN calls, voice calls placed over VoIP networks employ a variety of call control services using a variety of signaling protocols, for example, H.323-over-IP and Session Initiation Protocol (SIP)-over-IP. The H.323 standard is a comprehensive and very complex suite of protocols that provide specifications for real-time, interactive videoconferencing, data sharing and audio applications such as IP telephony. The SIP protocol is a more recent protocol that was developed specifically for IP telephony in view of popular web-based services. More efficient than H.323, SIP takes advantage of existing protocols to handle certain parts of the call control process.

Figure 2:
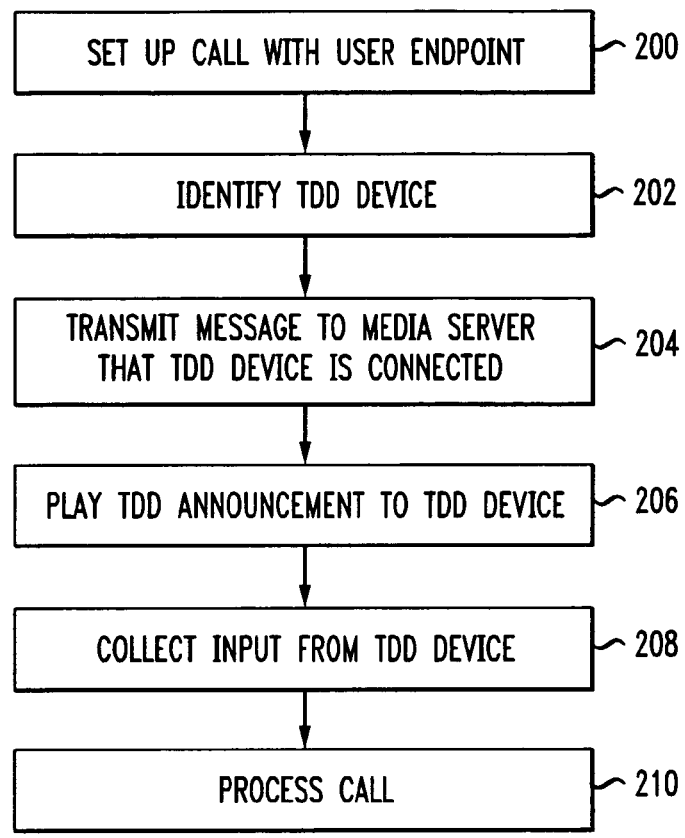
FIG. 2 is a flow chart of the steps performed by the components of the VoIP network to provide network-based services to the TDD device in accordance with an embodiment of the invention.

Also referring to FIG. 2, the VoIP network 100 establishes a call with a user endpoint (e.g., the TDD 104) in step 200. For example, a user endpoint connected to the VoIP network dials a toll-free number. A Call Control Element (CCE) 108 sets up the call with the user endpoint. During the set up of the call, signaling information 110 is communicated between the user endpoint and the CCE 108.

Specifically, the signaling information is transmitted through a border element 114. The border element 114 can either support TDM to IP conversion, IP to IP conversion, or can pass the signaling information through to its destination (e.g., the CCE 108).

The CCE 108 determines that the user endpoint has dialed a telephone number that is associated with application server 120. The CCE 108 then communicates with the application server 120 over communication line 122. The application server 120 is a server that provides one or more applications for VoIP calls, such as three way calling, calling name delivery, remote call forwarding, selective call acceptance, selective call rejection, caller ID block, call waiting, distinctive ringing, etc.

The application server 120 then determines, based on signaling information received on the call and other associated information, that the call requires the services of a media server 112. The media server 112 provides a platform for enhanced services such as speech recognition, audio conferencing, network-based voicemail systems, network tone and announcement delivery, and streaming audio and video. The media server 112 can also provide interactive voice response (IVR) processing. Communications (i.e., media 116) between the media server 112 and the TDD 104 pass through the border element 114. Communications between the media server 112 and the application server 120 occur over communications line 124. Communications between the media server 112 and the CCE occur over communications line 126.

The application server 120 then identifies the user endpoint 104 as a TDD device in step 202. In one embodiment, the input of the TDD device 104 is Baudot tones. Baudot tones are the basic communication language used by TDDs and are used for communicating via text. The media server 112 can also receive input from other devices (not shown) in the format of speech or Dual Tone Multi-Frequency (DTMF) tones.

Once the TDD device 104 is identified, the application server 120 then transmits a message to the media server 112 in step 204. The message notifies the media server 112 that the TDD device 104 is connected to the VoIP network 100. The media server 112 then plays a TDD announcement to the TDD device 104 in step 206 (e.g., media 116). The announcement can be related to a service provided by the VoIP network 100. The service may have several particular options to choose from. These choices are presented to the TDD device 104 in the TDD announcement. The tags or textual components of the voice markup language document direct the media server 112 to fetch and play an audio file that contains a TDD announcement.

The TDD announcement is generated from the media server 112 executing a document written in a markup language (e.g., Voice Extensible Markup Language (VXML), as described in the Voice Extensible Markup Language (VoiceXML) Version 2.0, W3C Recommendation, Mar. 16, 2004, which is incorporated herein by reference). In particular, the media server 112 has (or is in communication with) a VXML interpreter to interpret the VXML document. The interpreter parses the markup language and interprets any tags or textual components found within the electronic document.

The media server 112 can play prompts and generate synthesized text, record audio, and receive input via touch-tone entry or speech recognition by interpreting a VXML document. For example, the media server 112 can provide a "tree" that steps a user of a user endpoint through a selection process (i.e., voice dialogs) by interpreting a VXML document. A user traditionally interacts with these voice dialogs through the user's audio. Prompts and announcements are either provided by digitized audio or synthesized speech and user input is provided by DTMF or speech. Speech recognition software resides on the media server 112 to convert the user's state selection (e.g., "Yes" or "No") into a textual selection. In accordance with an embodiment of the invention, a user using the TDD device 104 interacts with voice dialogs via TDD input (e.g., Baudot tones).

The VXML document interpreted by the media server 112 supports TDD devices. The VXML document defines a conversational finite state machine (FSM) in which the user is always in one conversational state, or dialog, at a time. Each dialog determines the next dialog to transition to.

A VXML document is primarily composed of top-level elements called dialogs. There are two types of dialogs—forms and menus. Forms define an interaction that receives values from a set of field item variables. Each field may specify a grammar that defines the allowable inputs for that field. A menu displays the information to the user with a choice of options and then transitions to another dialog based on the selected choice. Each dialog typically has involved a series of speech and/or DTMF grammars, which are active only when the user is in that dialog. In one embodiment, the VXML document in accordance with the present invention includes a TDD input mode and grammar in addition to the typical voice and DTMF input modes and grammars. Thus, the input modes property of the VXML document supports new values to reflect support for TDD input, a combination of either TDD or DTMF input, or a combination of TDD/DTMF/voice input.

The media server 112 (i.e., the interpreter) interprets the VXML document and, in accordance with the VXML document's instructions, sends to the TDD device 104 an announcement. As described above, the TDD announcement is in the form of Baudot tones that appear on the display of the TDD device 104 as text. In one embodiment, the application server 120 determines which TDD announcement to play out of several TDD announcements based on Dialed Number logic (i.e., determining the telephone number that the user of the TDD device 104 dialed). The application server 120 then provides the announcement location (e.g., a Uniform Resource Identifier (URI) to the appropriate announcement file) to the media server 112.

The media server 112 then receives input from the TDD device 104 and transmits that information to the application server 120 to further process the call. For example, the application server 120 may process the input from the TDD device 104 by instructing the media server 112 to play a second TDD announcement to the TDD device 104. This second announcement may be based on the input received from the TDD device in response to the first announcement. The application server 120 may alternatively process the input from the TDD device 104 by requesting additional information or determining the destination of the call. This may be accomplished by either returning the user input to the application server 120 to make a determination, based on its logic, as to the next step in processing the call. Alternatively, this logic can be built into the VXML document, and the media server 112 can determine the next step by interpreting the VXML document. The media server 112 uses the input to process the call (i.e., determine what happens next on the call) in step 210.

Figure 3:
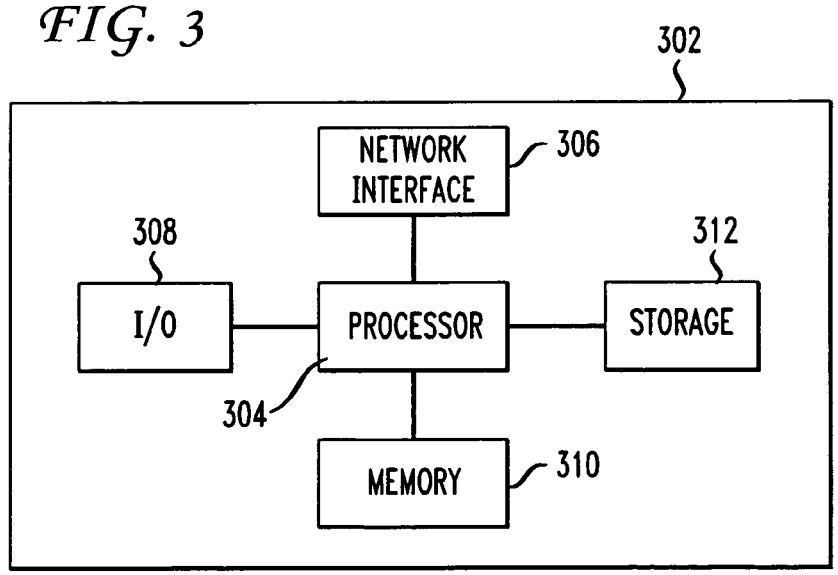
FIG. 3 is a high level block diagram of a computer system which may be used in an embodiment of the invention.

FIG. 3 shows a high level block diagram of a computer implementation of the media server 302. Media server 302 contains a processor 304 which controls the overall operation of the computer by executing computer program instructions which define such operation. The computer program instructions may be stored in a storage device 312 (e.g., magnetic disk) and loaded into memory 310 when execution of the computer program instructions is desired. Thus, the media server operation will be defined by computer program instructions stored in memory 310 and/or storage 312 and the computer will be controlled by processor 304 executing the computer program instructions. Computer 302 also includes one or more network interfaces 306 for communicating with other devices via a network. Media server 302 also includes input/output 308 which represents devices which allow for user interaction with the computer 302 (e.g., display, keyboard, mouse, speakers, buttons, etc.). One skilled in the art will recognize that an implementation of an actual computer will contain other components as well, and that FIG. 3 is a high level representation of some of the components of such a computer for illustrative purposes. Further, the application server 120 may contain one or more of the components shown in FIG. 3.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for communicating with a user of a telecommunication device for the deaf (TDD) over a Voice over Internet Protocol (VoIP) network comprising:
   (a) interpreting a voice markup language document supporting the TDD device;
   (b) transmitting a TDD message based on the interpreting to the TDD device over the VoIP network; and
   (c) receiving TDD input from the TDD device based on the TDD message.

2. The method of claim 1 comprising instructing a media server to play the TDD message to the TDD device.

3. The method of claim 1 further comprising processing the TDD input after receiving the TDD input.

4. The method of claim 1 wherein the interpreting of the voice markup language document further comprises interpreting a Voice Extensible Markup Language (VXML) document.

5. The method of claim 4 wherein interpreting the VXML document comprises supporting the TDD device.

6. The method of claim 5 wherein the supporting of the TDD device further comprises accepting TDD input as a form of user input.

7. A system for communicating with a user of a telecommunication device for the deaf (TDD) over a Voice over Internet Protocol (VoIP) network, the system comprising:
   (a) an application server for receiving input and determining that the input was transmitted from a TDD device; and
   (b) a media server for interpreting a voice markup language document to play a TDD message to the TDD device and to receive TDD input from the TDD device based on the TDD message,
   wherein the application server communicates its determination that the input was transmitted from the TDD device to the media server.

8. The system of claim 7 wherein the media server further comprises an interface for communicating with the TDD device.

9. The system of claim 7 wherein the application server further comprises an interface for transmitting a message to the media server in response to identifying the TDD device.

10. The system of claim 9 wherein the message instructs the media server to play the TDD message to the TDD device.

11. The system of claim 7 wherein the media server further comprises a processor for processing the TDD input after receiving the TDD input.

12. The system of claim 7 wherein the media server further comprises an interpreter for interpreting the voice markup language document.

13. The system of claim 7 wherein the voice markup language document is a Voice Extensible Markup Language (VXML) document.

14. A system for communicating with a user of a telecommunication device for the deaf (TDD) over a Voice over Internet Protocol (VoIP) network, the system comprising:
   (a) means for interpreting a voice markup language document supporting the TDD device;
   (b) means for transmitting a TDD message to the TDD device over the VoIP network based on the means for interpreting; and
   (c) means for receiving TDD input from the TDD device based on the TDD message.

15. The system of claim 14 further comprising means for instructing a media server to play the TDD message to the TDD device.

16. The system of claim 14 further comprising means for processing the TDD input after receiving the TDD input.

17. The system of claim 14 wherein the means for interpreting the voice markup language document further comprises means for interpreting a Voice Extensible Markup Language (VXML) document.

18. The system of claim 17 wherein the means for interpreting the VXML document comprises means for supporting the TDD device.

19. The system of claim 18 wherein the supporting of the TDD device comprises accepting TDD input as a form of user input.

* * * * *